United States Patent
Patnaikuni et al.

(10) Patent No.: US 12,085,899 B2
(45) Date of Patent: Sep. 10, 2024

(54) COMPUTER DRIVEN EXTERNAL DIGITAL CROWN FOR SMARTWATCH

(71) Applicant: International Business Machines Corporation, Armonk, NY (US)

(72) Inventors: Subha Kiran Patnaikuni, Visakhapatnam (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 17/303,717

(22) Filed: Jun. 6, 2021

(65) Prior Publication Data

US 2022/0390904 A1    Dec. 8, 2022

(51) Int. Cl.
| | |
|---|---|
| *G04G 21/08* | (2010.01) |
| *G04G 17/04* | (2006.01) |
| *G06F 1/16* | (2006.01) |
| *G04G 17/00* | (2013.01) |
| *G04G 21/00* | (2010.01) |

(52) U.S. Cl.
CPC ............ *G04G 21/08* (2013.01); *G04G 17/04* (2013.01); *G06F 1/163* (2013.01); *G06F 1/169* (2013.01); *G04G 17/00* (2013.01); *G04G 21/00* (2013.01)

(58) Field of Classification Search
CPC ........ G04G 21/08; G04G 17/04; G04G 17/00; G04G 21/00; G06F 1/163; G06F 1/169
See application file for complete search history.

(56) References Cited

U.S. PATENT DOCUMENTS

| | | | | |
|---|---|---|---|---|
| 3,488,565 | A * | 1/1970 | Teltscher | G04B 47/00 968/398 |
| 6,300,938 | B1 * | 10/2001 | Culver | G06F 3/0362 345/184 |
| 6,556,222 | B1 | 4/2003 | Narayanaswami | |
| 7,272,077 | B2 * | 9/2007 | Nobs | G04G 21/00 368/321 |
| 8,184,095 | B2 * | 5/2012 | Pan | G06F 3/0338 345/184 |
| 8,830,166 | B2 * | 9/2014 | Nien | G06F 3/0354 345/157 |
| 9,024,873 | B2 * | 5/2015 | Nien | G06F 3/0354 345/157 |
| 9,904,254 | B1 * | 2/2018 | Hariri | G04G 21/04 |
| 10,379,635 | B2 * | 8/2019 | Wang | G06F 3/03548 |

(Continued)

OTHER PUBLICATIONS

"What is the Digital Crown on Apple Watch?", IPHONEFAQ, last printed Jun. 4, 2021, 1 page, <https://www.iphonefaq.org/archives/974331>.

*Primary Examiner* — Edwin A. Leon
*Assistant Examiner* — Sean R Brannon
(74) *Attorney, Agent, or Firm* — Michael A. Petrocelli

(57) ABSTRACT

An external digital crown for a smartwatch can be implemented using a computer. A smartwatch having a display can receive an electronic cue from a digital crown. The electronic cue can related to a tactile event on the digital crown from a user. The digital crown can be positioned contiguously with the watch. The electronic cue can be analyzed to relate the tactile event to a movement of an indicator on the display for a selection on the display, and a selection can be initiated on the display based on the analysis of the electronic cue.

14 Claims, 7 Drawing Sheets

(56) References Cited

U.S. PATENT DOCUMENTS

| | | | |
|---|---|---|---|
| 2009/0021482 A1* | 1/2009 | Lee | G06F 1/169 |
| | | | 345/163 |
| 2011/0134031 A1* | 6/2011 | Wang | G06F 3/0304 |
| | | | 345/157 |
| 2011/0199306 A1* | 8/2011 | Pan | G06F 1/1632 |
| | | | 345/157 |
| 2013/0033420 A1* | 2/2013 | Nien | G06F 3/0354 |
| | | | 345/156 |
| 2016/0334888 A1 | 11/2016 | Park | |
| 2018/0018026 A1 | 1/2018 | Bushnell | |
| 2018/0052428 A1 | 2/2018 | Abramov | |
| 2018/0113486 A1* | 4/2018 | Chen | G06F 1/1694 |
| 2018/0321786 A1* | 11/2018 | Dangy Caye | G04G 21/08 |
| 2018/0364815 A1* | 12/2018 | Moussette | G04G 21/00 |
| 2019/0129521 A1* | 5/2019 | Chang | G06F 3/0362 |

* cited by examiner

COMPUTER DRIVEN EXTERNAL DIGITAL CROWN FOR SMARTWATCH

BACKGROUND

The present disclosure relates to computer implementing an external digital crown for a smartwatch.

In one example, a digital crown on a smartwatch can provide similar functionality to a crown found on mechanical watches. Historically, for example, a crown on a watch is used to set the date and time on a wristwatch, and to wind the mainspring to keep the watch running. In one example, smartwatch users can press a digital crown to return to a home screen, much like a home button on a smart phone. In one example, a digital crown can also be rotated to zoom and scroll on a display of a smartwatch, depending on context. The function of the digital crown can allow the user to zoom and scroll without having to pinch, swipe or otherwise obstruct the smartwatch display.

In one example, a smartwatch can be paired with a mobile device. The smartwatch can also have different applications installed, and at the same time, as the smartwatch is paired with a mobile device, a user can also visualize an application which is also installed in the mobile device. In general, a user has to perform touch interaction with a smartwatch display to select from a menu on a display.

In one example, to select any menu or application or any configuration, a user may need to perform touch interaction with a smartwatch display. In this case, a user may have to apply appropriate pressure or rotate the smartwatch crown for returning to a home screen on the display or previous menu on the display. In another example, zooming out or in on the displayed content can be implemented by a user using the smartwatch crown.

In one example, while navigating to a smartwatch menu or application, a user may have to move their finger from a smartwatch display to a smartwatch crown. In another example, a combination of both the interactions, a finger on a smartwatch display and manipulation of the smartwatch crown, where a user can navigate to smartwatch menu. In one example, a user has to move a finger from a display to a crown, at the same time, or in sequence. In one instance, while touching on the smartwatch display a major portion of the display may be covered by a finger area.

SUMMARY

The present disclosure recognizes the shortcomings and problems associated with current techniques for duplicating or copying a workflow for a machine or device to another machine or device.

One issue with current smartwatch operation, is that a user may have to manipulate the crown of the smartwatch in combination with touching the display of the watch, wither in combination or sequence. Such manipulations can be difficult, awkward, and/or block content on the display.

The present invention can include a method and system by which, a smartwatch crown is attached externally, either with a smartwatch belt or with a ring device. Thereby, while interacting with the external crown, a user can move his finger along with the length and width of the external crown and can also rotate the external crown, so while interacting with external crown a user can navigate with a smartwatch menu on a display without lifting their finger from the external crown.

In an aspect according to the present invention, a computer-implemented method for for implementing an external digital crown for a smartwatch includes receiving, at a smartwatch having a display, an electronic cue from a digital crown. The electronic cue is related to a tactile event on the digital crown from a user, and the digital crown is positioned contiguously with the watch. The method includes analyzing the electronic cue to relate the tactile event to a movement of an indicator on the display for a selection on the display; and initiating the selection on the display based on the analysis of the electronic cue.

In a related aspect, the digital crown can be positioned in a watch band, and the watch band being connected to the smartwatch.

In a related aspect, the digital crown can include a cylindrical roller positioned within the watch band.

In a related aspect, the watch band can define a width, and the cylindrical roller traverses the width of the watch band.

In a related aspect, the selection on the display can include a selection of an icon on the display.

In a related aspect, the method further includes sending the electronic cue from the digital crown, in response to a touch detection as part of the tactile event on the digital crown.

In a related aspect, the method includes sending the electronic cue from the digital crown, in response to detecting tactile pressure on the digital crown as part of the tactile event.

In a related aspect, the digital crown can be positioned in a watch band, and the watch band can be connected to the smartwatch. And the method further includes detecting tactile pressure along a cylindrical roller as at least part of the digital crown, and the cylindrical roller is positioned in the watch band.

In a related aspect, the digital crown is not part of a casing of the watch, wherein the casing houses the internal mechanisms of the watch and includes a watch band attachment portion for attaching a watch band to the casing.

In a related aspect, the digital crown can be positioned in a watchband, and the watchband is connected to the smartwatch. The digital crown can be connected to a casing of the watch via the watchband and is not part of the casing of the watch. The casing can house the internal mechanisms of the watch and include a watchband attachment portion for attaching the watchband to the casing.

In another aspect, according to the present invention, a system using a computer for implementing an external digital crown for a smartwatch, which includes: a computer system comprising; a computer processor. A computer-readable storage medium, and program instructions are stored on the computer-readable storage medium being executable by the processor, to cause the computer system to perform the following functions to; receive, at a smartwatch having a display, an electronic cue from a digital crown, the electronic cue being related to a tactile event on the digital crown from a user, the digital crown being positioned contiguously with the watch; analyze the electronic cue to relate the tactile event to a movement of an indicator on the display for a selection on the display; and initiate the selection on the display based on the analysis of the electronic cue.

In a related aspect, the digital crown can be positioned in a watch band, and the watch band being connected to the smartwatch.

In a related aspect, the digital crown can include a cylindrical roller positioned within the watch band.

In a related aspect, the watch band defines a width, and the cylindrical roller traverses the width of the watch band.

In a related aspect, the selection on the display includes a selection of an icon on the display.

In a related aspect, the system further includes sending the electronic cue from the digital crown, in response to a touch detection as part of the tactile event on the digital crown.

In a related aspect, the system includes sending the electronic cue from the digital crown, in response to detecting tactile pressure on the digital crown as part of the tactile event.

In a related aspect, the digital crown is positioned in a watch band, and the watch band being connected to the smartwatch; and the system further comprising: detecting tactile pressure along a cylindrical roller as at least part of the digital crown, the cylindrical roller being positioned in the watch band.

In a related aspect, the digital crown is not part of a casing of the watch, wherein the casing houses the internal mechanisms of the watch and includes a watch band attachment portion for attaching a watch band to the casing.

In a related aspect, a smartwatch including an external digital crown, which includes: a smartwatch casing housing internal mechanisms for the operation of a smartwatch, and the smartwatch having a display; a digital crown positioned in a watch band, the watch band being connected to the smartwatch casing, the digital crown having pressure sensitivity enabling tactile movement detection responsive to tactile movement of a user; and the smartwatch having a receiving component for receiving an electronic cue from the digital crown in relation to the movement detection.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

EMBODIMENTS AND EXAMPLES

Figure 1:
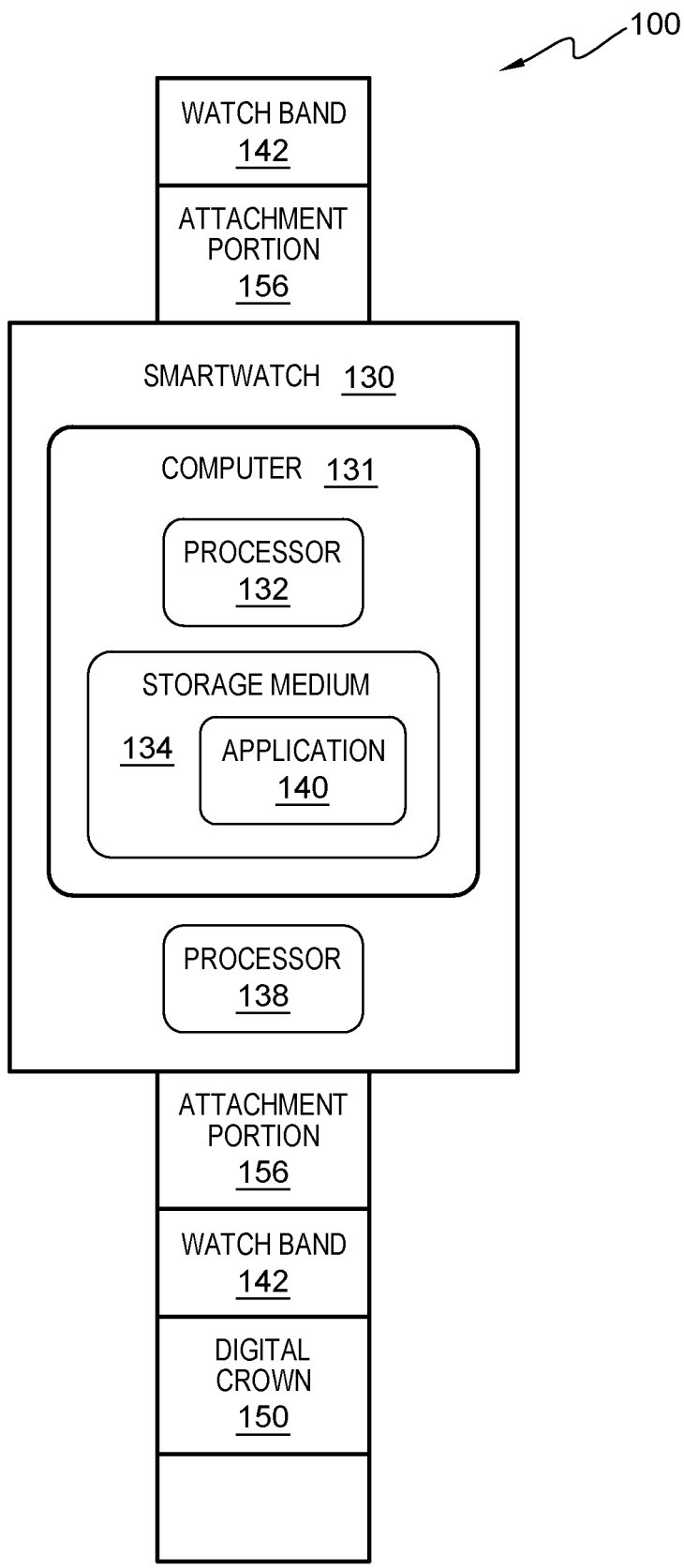
FIG. 1 is a schematic block diagram illustrating an overview of a system, system features or components, and methodology for implementing an external digital crown for a smartwatch, according to an embodiment of the present disclosure.
Figure 2:
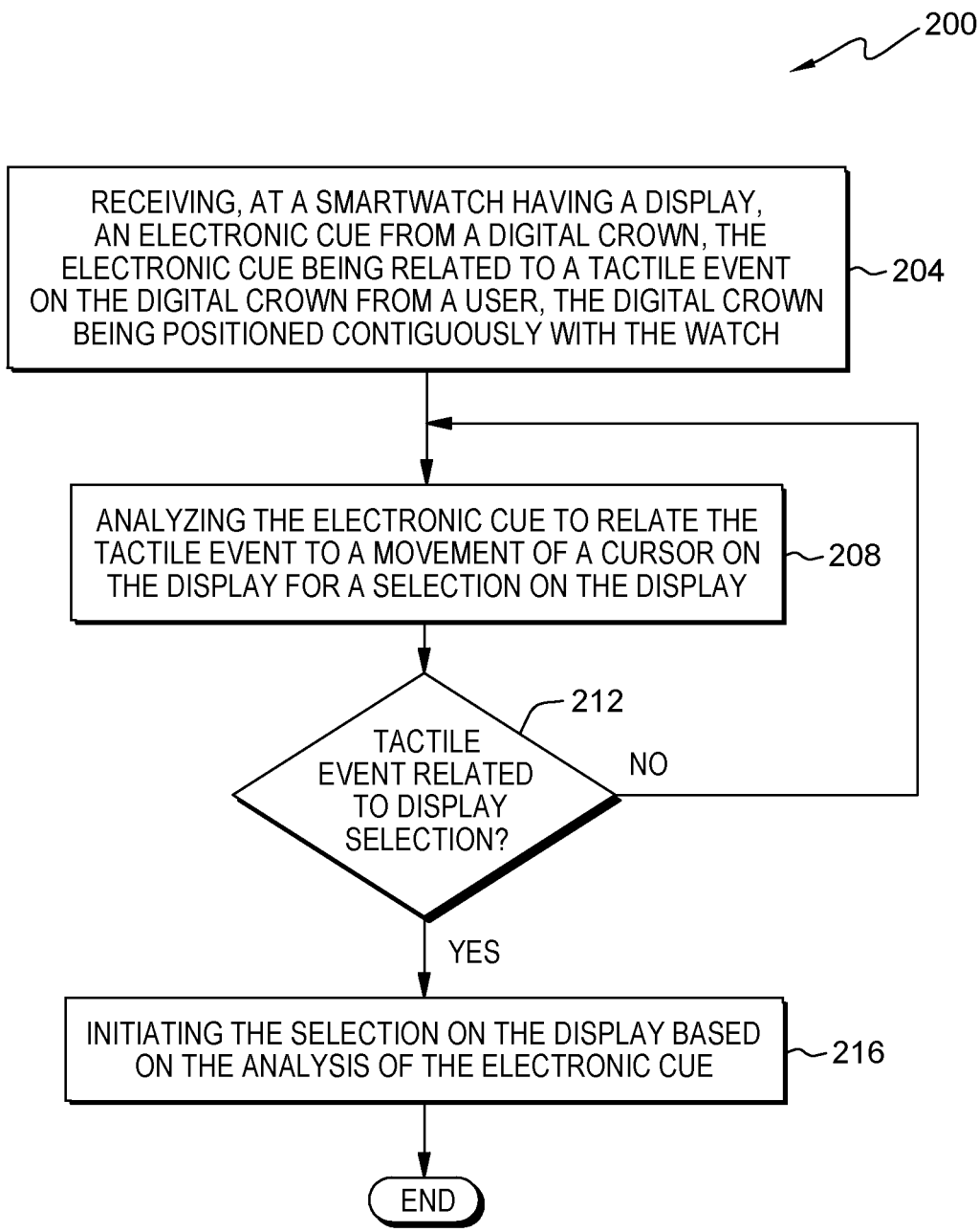
FIG. 2 is a flow chart illustrating a method, implemented using the system shown in FIG. 1, for implementing an external digital crown for a smartwatch, according to an embodiment of the present disclosure.
Figure 3:
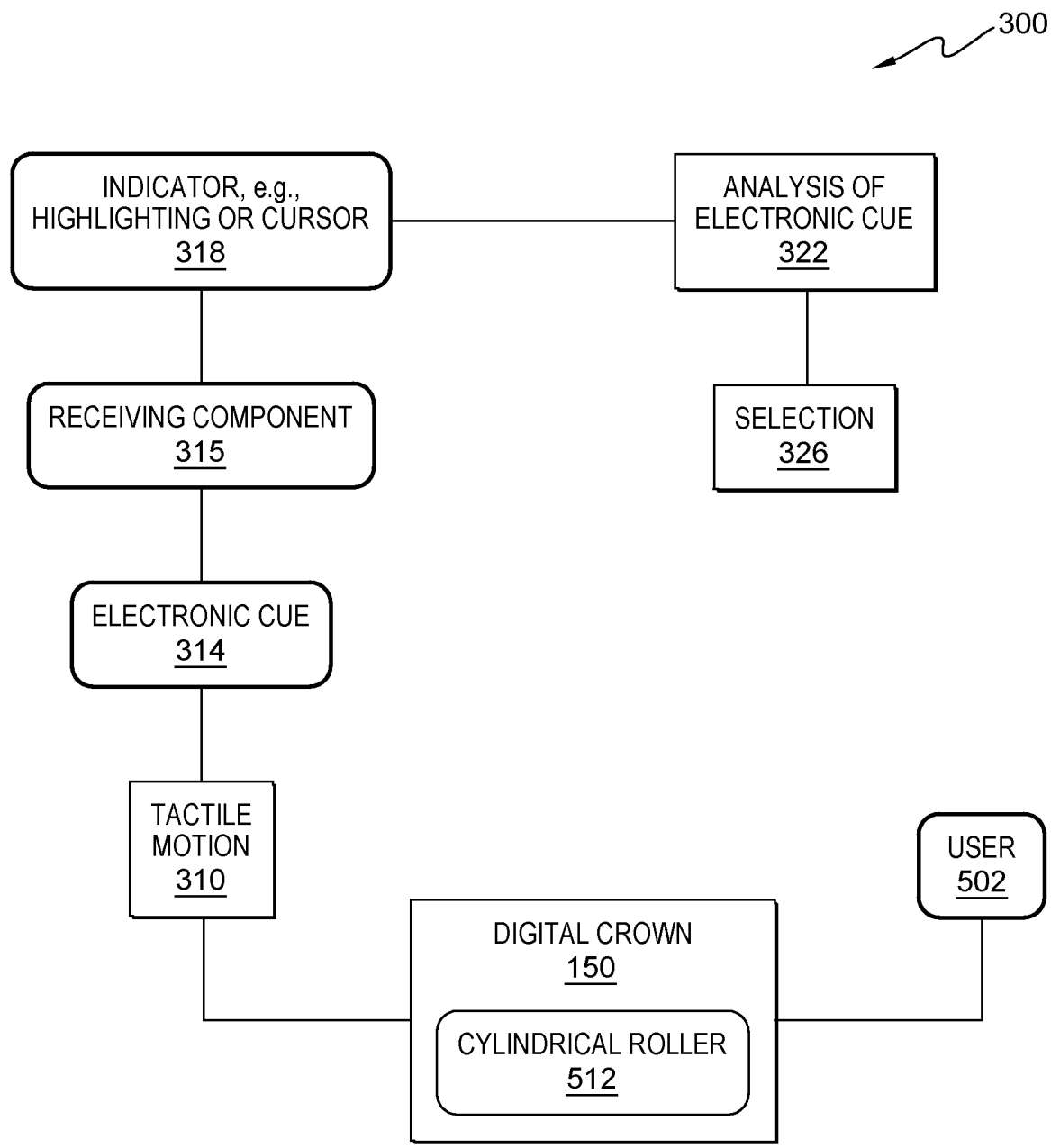
FIG. 3 is a functional schematic block diagram showing a series of operations and functional methodologies, for instructional purposes illustrating functional features of the present disclosure associated with the embodiments shown in the FIGS., which can be implemented, at least in part, in coordination with the system shown in FIG. 1, for implementing an external digital crown for a smartwatch.

Referring to FIGS. 1, 2 and 3, a computer-implemented method 200 can include using an external digital crown for a smartwatch, according to an embodiment of the present disclosure. Referring to FIG. 1, a system 100 includes the smartwatch 130, watch band 142 and a digital crown 150. Referring to FIG. 3, a system 300 includes operational interactions for functions of the method 200 and system 100.

It is understood that a watch strap or a watch band (or alternatively a watch bracelet, or a watch belt) is a bracelet that straps a wristwatch or a smart watch onto a person or user's wrist. Watch straps may be made of leather, plastic, rubber, cloth, or metal, sometimes in combination. It can be regarded as a fashion item, serving both a utilitarian and decorative function.

Referring to FIG. 2, the computer-implemented method 200 includes a series of operational blocks for implementing an embodiment according to the present disclosure which can include the system shown in FIG. 1. The operational blocks of the methods and systems according to the present disclosure can include techniques, mechanism, modules, and the like for implementing the functions of the operations in accordance with the present disclosure.

The method 200 includes operations for implementing an external digital crown for a smartwatch. The method 200 includes receiving, at a smartwatch 130 having a display 138, an electronic cue 314 (or an instruction) from a digital crown, as in block 204. The smartwatch 130 includes a computer 131, processor 132, storage medium 134, software applications 140. The smartwatch is adapted to receive a signal such as a cue from the digital crown. The cue relates to a tactile event 310 on the digital crown 150. The tactile event can include a tactile motion, where such motion can include a longitudinal motion with a user's finger, a rotation motion, and also include pressure applied by a user's finger. The tactile event, e.g., motion is synchronized with a selection on the display, such as a highlighted movement or such indication 318 on the display, or in another example, a highlighted area or section highlighting a selection on the display. In another example, a selection on the display can include a cursor or a cursor motion shown on the display, for selecting items initiated by a user 502, or a motion indicator moving on the display initiated by the user. The electronic cue is related to the tactile event detection on the digital crown from a user, as in block 204. Such tactile detection can include motion and/or pressure on the digital crown. The digital crown is physically separated from the smartwatch, for example, the digital crown is positioned contiguously with the watch, also as referred to in block 204.

The method 200 further includes analyzing 322 the electronic cue 314 to relate the tactile motion to a selection 326 on the display. The selection can include for example, a movement of a cursor or a movement of a highlighted area or section, or a highlighted selection, on the display to indicate a selection on the display.

When the tactile motion is not related to a display selection in block 212, as described above, the method returns to block 208. When the tactile motion is related to a display selection in block 212 as describe above, the method proceeds to block 216.

The method 200 includes initiating the selection on the display based on the analysis of the electronic cue, as in block 216. For example, motion and/or pressure on the digital crown can be received and synchronized with motion of a highlighted or cursor on the display of the smartwatch, and thereby such highlighting or selection on the display can be used to select items or selections on the display.

In one example, the digital crown 150 is positioned in a watch band 142, and the watch band 142 is connected to the smartwatch 130.

Figure 5:
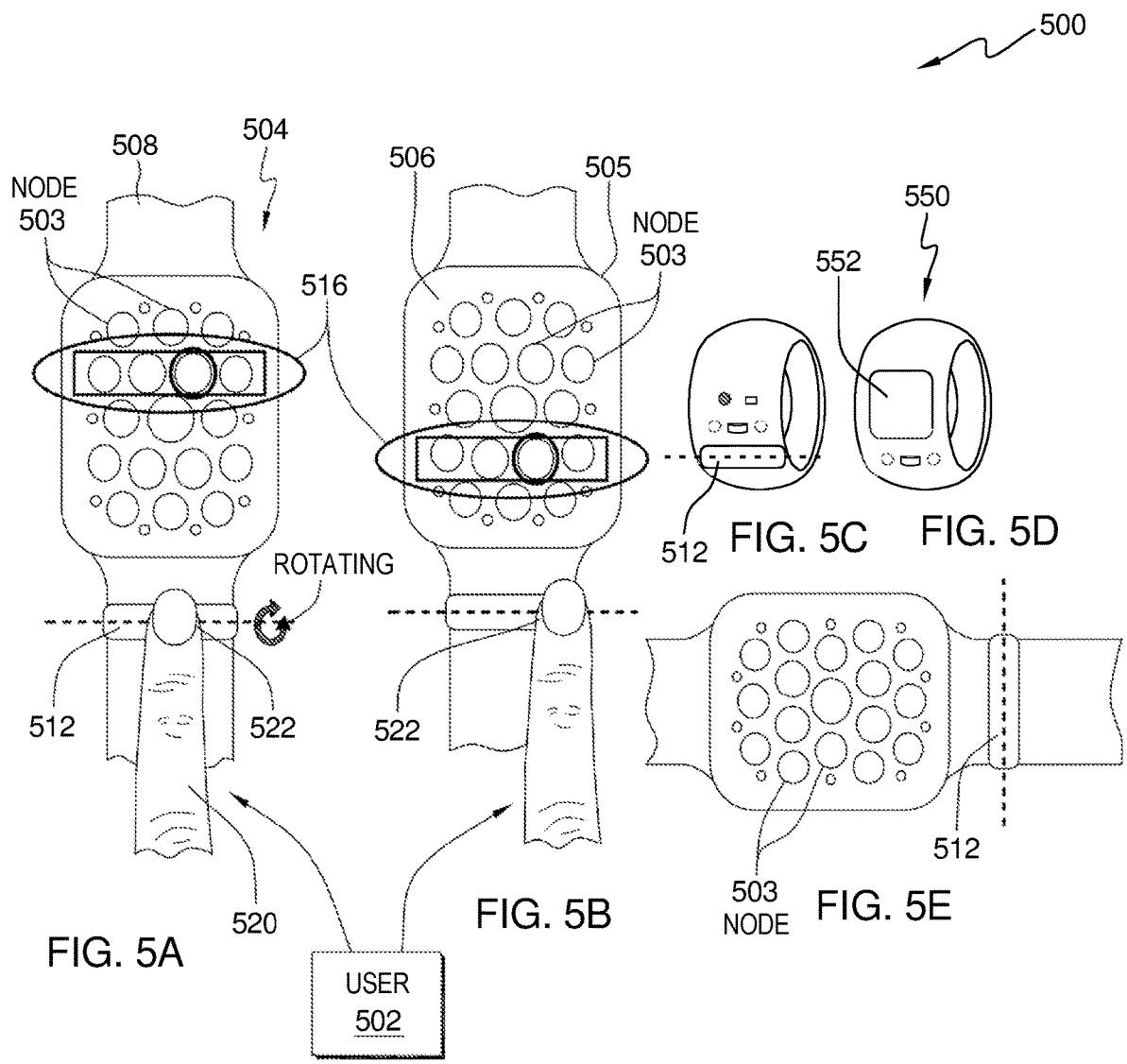
FIG. 5A depicts a top view of a smartwatch, showing features related to the present disclosure for implementing an external digital crown for a smartwatch.
FIG. 5B depicts a top view of the smartwatch shown in FIG. 5A, showing features related to the present disclosure for implementing an external digital crown for a smartwatch.
FIG. 5C depicts an isometric view of a ring device, showing features related to the present disclosure for implementing an external digital crown.
FIG. 5D depicts an isometric view of another embodiment of a ring device, showing features related to the present disclosure for implementing an external digital crown.
FIG. 5E depicts a top view of another embodiment of a smartwatch device, showing features related to the present disclosure for implementing an external digital crown.

Referring to FIG. 5, in one example, the digital crown includes a cylindrical roller 512 positioned within the watch band 508.

Referring to FIG. 1, and 5, in one example, the watch band defines a width, and the cylindrical roller traverses the width of the watch band.

In one example, the selection on the display includes a selection of an icon on the display. For example, nodes 503 shown in FIG. 5 can be application icons available for selection.

In another example, the method can further include sending the electronic cue from the digital crown, in response to a touch detection as part of the tactile motion on the digital crown. For example, using the digital crown a tactile event can be detected by the smartwatch, and such event can be related to selection or motions on the display of the smartwatch. Such tactile event can include pressure from a finger or fingertip touching the digital crown, or sliding of a finger along the digital crown, or rolling about the digital crown using a person's finger.

In another example, the method can include sending the electronic cue from the digital crown, in response to detecting tactile pressure on the digital crown as part of the tactile motion.

In one example, the digital crown can be positioned in a watch band, and the watch band connected to the smartwatch. The method can further include detecting tactile pressure along a cylindrical roller as at least part of the digital crown, and the cylindrical roller being positioned in the watchband.

In another example, the digital crown is not part of a casing of the watch, and the casing houses the internal mechanisms of the watch and includes a watch band attachment portion for attaching a watch band to the casing.

Figure 4:
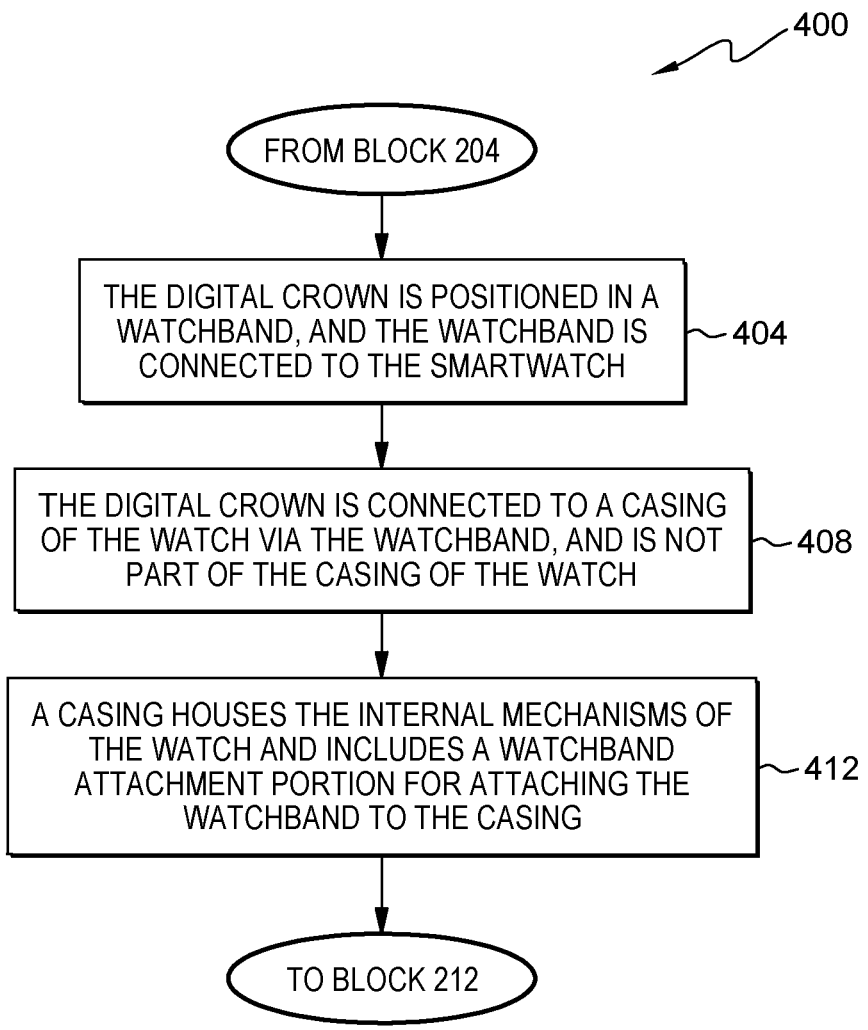
FIG. 4 is a flow chart illustrating another method, which continues from the flow chart of FIG. 2, for implementing an external digital crown for a smartwatch.

Referring to FIG. 4, with reference to FIG. 5, a method 400 according to an embodiment of the present disclosure, continues from block 204 of the method 200 shown in FIG. 2, the digital crown 512 is positioned in a watchband 508, and the watchband is connected to the smartwatch 504, as in block 404. The digital crown can be connected to a casing 505 of the watch 504 via the watchband 508 and is not part of the casing 505 of the watch, as in block 408. The casing houses the internal mechanisms (not shown) of the watch and includes a watchband attachment portion 156 (shown generically in FIG. 1) for attaching the watchband to the casing, as in block 412. The method proceeds to block 208 of the method 200 in FIG. 2.

In another embodiment according to the present disclosure, referring to the FIGS., a smartwatch includes an external digital crown 150, and the smartwatch includes a casing 505 housing internal mechanisms for the operation of a smartwatch. Further, the smartwatch includes a display 138. The digital crown 150 is positioned in a watchband 142, and the watch band is connected to the smartwatch casing. The digital crown has pressure sensitivity enabling tactile event, e.g., movement detection responsive to tactile movement of a user. The smartwatch has a receiving component 315 for receiving an electronic cue 314 from the digital crown in relation to the movement detection.

Other Embodiments and Examples

Additionally, the method and system is discussed with reference to FIG. 3, which is a functional system 300 which includes components and operations for embodiments according to the present disclosure, and is used herein for reference when describing the methods and systems of the present disclosure. Additionally, the functional system 300, according to an embodiment of the present disclosure, depicts functional operation indicative of the embodiments discussed herein. Referring to FIG. 3, wherein similar components have the same reference numerals as the system 100 shown in FIG. 1, a system 300 includes or operates in concert with a computer 131 for implementing an external digital crown for a smartwatch.

More Embodiments and Examples

Referring to FIG. 5, in one embodiment according to the present disclosure, a system 500 can be used for implementing an external digital crown for a smartwatch.

According to the present disclosure, a method and system includes a smartwatch having a smartwatch crown attached externally to the smartwatch. In one example the smartwatch crown can be attached externally to the smartwatch by either using a smartwatch belt or with a ring device or digital ring/device. Thereby, while interacting with the external crown, a user can move their finger along with the length and width of an external crown, and can also rotate the external crown. Thus, while interacting with the external crown, a user can navigate with a smartwatch menu without lifting their finger from the external crown. Thus, a method and system according to the present disclosure, can include a user navigating a smartwatch menu without moving their finger from a smartwatch display to smartwatch crown to smartwatch display. Thus, without a user moving a finger to two different position, the user can navigate smartwatch content.

According to one embodiment of the present disclosure, along the width of a smartwatch belt, a cylindrical roller can be fixed at the smartwatch belt or within the smartwatch belt or band. A user can use the cylindrical roller as a digital external crown of the smartwatch.

In one example, the surface of the cylindrical roller can be touch sensitive, and based on a position of touch on the cylindrical roller, a user can select an appropriate menu item or displayed application on a display of the smartwatch.

In another example, an appropriate applied threshold limit of pressure on the cylindrical roller and rotation of the said cylindrical roller together can be used to select item/applications on a display of the smartwatch. Using the digital crown, the user can get a similar functionality as the rotation of a smartwatch crown, for example, zooming in/out, scrolling content, etc. While selecting a menu or application displayed on a smartwatch, a user can perform rotation using the cylindrical roller, and using finger movement on the length of the cylindrical roller a user can select appropriate menu items displayed on the smartwatch. Towards a palm side of a ring device, the ring device can be having cylindrical roller along with, or commensurate with, the width of the ring device. Accordingly, the user can perform rotation using the cylindrical roller attached with the ring device with another finger of the same hand thereby controlling the smartwatch.

Again referring to FIG. 5, the system 500 includes a smartwatch 504 including a smartwatch belt 508 having a cylindrical roller 512. Based on the rotation of the cylindrical roller 512, a user 502 can select an appropriate portion 516, which for example can become highlighted in relation to pressure on the cylindrical roller 512 by finger movement, to highlight a menu/application displayed on a display 506 of the smartwatch 504. With appropriate pressure, the user can use the cylindrical roller as a digital crown of the smartwatch. For example, nodes 503 can be in the highlighted portion 516 and can be application icons available for selection.

In one example a smartwatch belt can have a slot to attach a cylindrical roller, and the cylindrical roller can be connected on a mounted bearing towards the width side of the smartwatch belt or band. The cylindrical roller can rotate in any direction on the mounted bearing on the smartwatch belt. The curved area of the cylindrical roller can be touch sensitive, while interacting with the roller, and the cylindrical roller can be able to identify which part of the cylindrical roller is touched. The cylindrical roller can also receive pressure or stress measurement sensors, and it can measure applied pressure on the cylindrical roller. The proposed cylindrical roller can be attached with smartwatch belt or band, and the same can also be attached to a ring device 550. The attached cylindrical roller with the smartwatch belt can receive power directly from the smartwatch, and at the same time, the cylindrical roller attached with a ring device can receive power from the ring device.

While interacting with the external crown or the cylindrical roller, the smartwatch belt or the ring device can identify the direction of rotation, any applied pressure, or touch point on the cylindrical roller etc. The cylindrical roller attached with the smartwatch belt can sense signals to the smartwatch for smartwatch content interaction.

For a ring device 550, a ring device can be paired with a smartwatch, so the interaction with the cylindrical roller attached with or to a ring device which can communicate with the smartwatch. The ring device 550 can include a display 552. The cylindrical roller 512 can be position along a width of the ring.

The length of the cylindrical roller can be mapped with the width of the smartwatch display. Based on the rotation of the cylindrical roller, and associated position of a fingertip 322 of a finger 320 of a user 302 on the cylindrical roller 312, applied pressure etc., a user can interact with the smartwatch display. The interaction with the cylindrical roller can be mapped with the smartwatch display. When the cylindrical roller is attached with the smartwatch belt or band, the signals from the cylindrical roller interaction by the user can be visualized, that is displayed for viewing by the user, as changes in the smartwatch display. When a user uses a ring device to interact with the smartwatch, the ring device can send signals to the smartwatch. While selecting any menu item or application from the smartwatch screen, the user has to touch on the cylindrical roller installed at the smartwatch belt or on the ring device. When the cylindrical roller is touched, the system can identify a finger touch on the cylindrical roller. The cylindrical roller can show a visual indication on the smartwatch display for the user to understand which portion of the smartwatch is mapped with the cylindrical roller length. A user can move the finger along with the length of the cylindrical roller, and accordingly can select the portion of the smartwatch and apply appropriate pressure to select the menu/application, etc. When a user rolls the cylindrical roller, then the system shows a next selected portion 316 mapped with the smartwatch display. Based on a rotation direction of the cylindrical roller, the user can select an appropriate portion of content on the smartwatch display. If user wants to use the cylindrical roller as a smartwatch digital crown, then the user can apply appropriate pressure and accordingly the cylindrical roller will be converted to smartwatch digital crown. When the cylindrical roller is converted to smartwatch digital crown after applying appropriate pressure, then the user can perform the same activity/function as with a smartwatch crown, for example, zooming, scrolling, rotating content, etc.

In another example, when a belt is changed the cylindrical roller can be an accessory of a smartwatch, and the cylindrical roller can be taken out from the belt. Using a magnetic lock, the cylindrical roller can be attached to a new belt. And the cylindrical roller can connect wirelessly with a smart watch, or when the cylindrical roller is attached with a belt, and the belt is attached with the smart watch, then the cylindrical roller can perform communication with direct contact. In another example, the roller can be an additional extension of a smartwatch, based on the dimension of the wrist, that can be positioned as aligned with a wrist curvature, and can remain close to the smart watch. Thereby, the roller can be in front of the user, in the user's line of sight, and remain in the user's line of sight to access the smartwatch with different sizes of a user's wrist.

In further examples according to the present disclosure, a method and system according to the present disclosure can include facilitating an external digital crown for a smartwatch with a smartwatch belt or with the ring device, where a user can rotate or his finger along with the length and width of the external crown to navigate with the smartwatch menu/content. A smartwatch can include a cylindrical roller fixed at the smartwatch belt, along the width of smartwatch belt, so that the user can use the said cylindrical roller as an external digital crown of the smartwatch, where the surface of the cylindrical roller will be touch sensitive, and based on a position of touch on the cylindrical roller, the user can select an appropriate menu/application displayed on the smartwatch. Further, the smartwatch can enable the user to get similar functionality as the rotation of a smartwatch crown without lifting a finger from the external crown, like zooming in/out, scrolling content etc., with appropriate applied threshold limit of pressure on the cylindrical roller and rotation of the said cylindrical roller together. Further, the smartwatch can enable the user to perform rotation of the cylindrical roller attached with the ring device with another finger of the same hand to control the smartwatch where towards the palm side of ring device can have a cylindrical roller along with the width of the ring device. Thereby, a cylindrical roller is fixed at the smartwatch belt along with the width of smartwatch belt so that the user can use the touch sensitive cylindrical roller as an external digital crown of the smartwatch, enables the user to select an appropriate menu/application displayed on the smartwatch display based on a position of touch on the cylindrical roller.

Thus, according to the present disclosure, a smartwatch digital crown can be attached externally, either with a smartwatch belt or with a ring device, so while interacting with the external crown, a user can move their finger along with the length and width of the external crown and can also rotate the external crown. Thus, while interacting with the external digital crown, the user can navigate with smartwatch menu without lifting their finger from the external crown.

More Examples and Embodiments

Operational blocks and system components shown in one or more of the figures may be similar to operational blocks and system components in other figures. The diversity of operational blocks and system components depicting example embodiments and aspects according to the present disclosure. For example, the method shown in FIG. 4 is intended as another example embodiment which can include aspects/operations shown and discussed previously in the present disclosure, in one example, continuing from a previous method shown in associated flow chart.

Additional Examples and Embodiments

Figure 6:
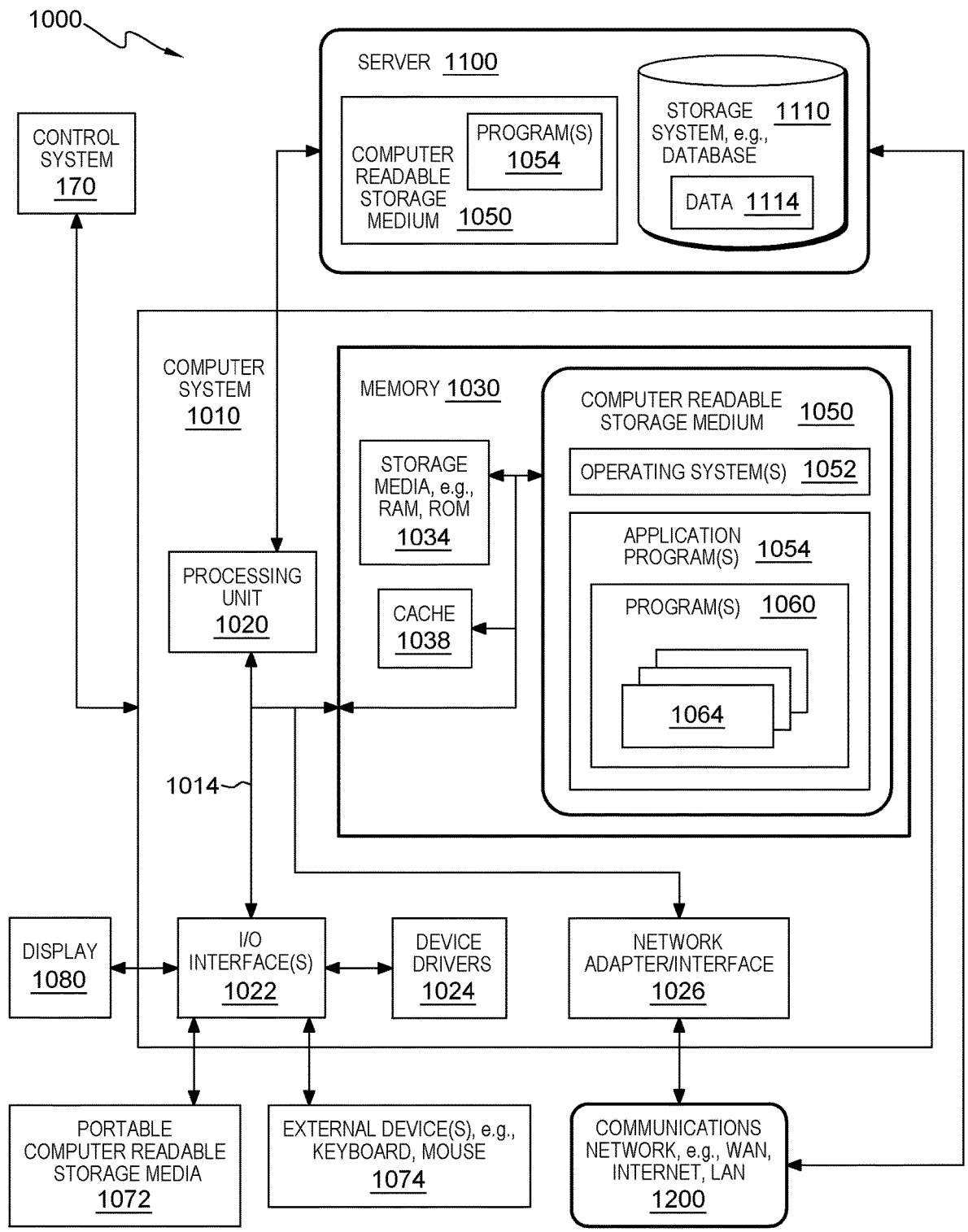
FIG. 6 is a schematic block diagram depicting a computer system according to an embodiment of the disclosure which may be incorporated, all or in part, in one or more computers or devices shown in FIG. 1, and cooperates with the systems and methods shown in the FIGS.

In the embodiment of the present disclosure shown in FIGS. 1 and 2, a computer can be part of a remote computer or a remote server, for example, remote server 1100 (FIG. 6). In another example, the computer 131 can be part of a control system 170 and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device 130 can include a computer 131 having a processor 132 and a storage medium 134 which stores an application 140, and the computer includes a display 138. The application can incorporate program instructions for executing the features of the present disclosure using the processor 132. In another example, the mobile device application or computer software can have program instructions executable for a front end of a software application incorporating the features of the method of the present disclosure in program instructions, while a back end program or programs, of the software application, stored on the computer of the control system communicates with the mobile device computer and executes other features of the method. The control system and the device (e.g., mobile device or computer) can communicate using a communications network, for example, the Internet.

Thereby, the method 100 according to an embodiment of the present disclosure, can be incorporated in one or more computer programs or an application 140 stored on an electronic storage medium 134, and executable by the processor 132, as part of the computer on mobile device. For example, a mobile device can communicate with the control system, and in another example, a device such as a video feed device can communicate directly with the control system. Other users (not shown) may have similar mobile devices which communicate with the control system similarly. The application can be stored, all or in part, on a computer or a computer in a mobile device and at a control system communicating with the mobile device, for example, using the communications network, such as the Internet. It is envisioned that the application can access all or part of program instructions to implement the method of the present disclosure. The program or application can communicate with a remote computer system via a communications network (e.g., the Internet) and access data, and cooperate with program(s) stored on the remote computer system. Such interactions and mechanisms are described in further detail herein and referred to regarding components of a computer system, such as computer readable storage media, which are shown in one embodiment in FIG. 6 and described in more detail in regards thereto referring to one or more computer systems 1010.

Thus, in one example, a control system is in communication with the computer 131 or device 130, and the computer can include the application or software 140. The computer 131, or a computer in a mobile device 130 communicates with the control system using the communications network.

In another example, the control system can have a front-end computer belonging to one or more users, and a back-end computer embodied as the control system.

Also, referring to FIG. 1, a device 130 can include a computer 131, computer readable storage medium 134, and operating systems, and/or programs, and/or a software application 140, which can include program instructions executable using a processor 132. These features are shown herein in FIG. 1, and also in an embodiment of a computer system shown in FIG. 6 referring to one or more computer systems 1010, which may include one or more generic computer components.

The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

Specifically, regarding the control system 170, a device(s) 130, or in one example devices which can belong to one or more users, can be in communication with the control system via the communications network. In the embodiment of the control system shown in FIG. 1, the control system 170 includes a computer communicating with a database and one or more programs stored on a computer readable storage medium. In the embodiment of the disclosure shown in FIG. 1, the device communicates with the control system and the one or more programs stored on a computer readable storage medium. The control system includes the computer having a processor, which also has access to the database.

The control system 170 can include a storage medium for maintaining a registration of users and their devices for analysis of the audio input. Such registration can include user profiles, which can include user data supplied by the users in reference to registering and setting-up an account. In an embodiment, the method and system which incorporates the present disclosure includes the control system (generally referred to as the back-end) in combination and cooperation with a front end of the method and system, which can be the application. In one example, the application is stored on a device, for example, a computer or device on location, and can access data and additional programs at a back end of the application, e.g., control system.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, as in the example shown in FIG. 1 of a device 130 and computer 131 having the application 140. The application 140 is stored on the device or computer and can access data and additional programs at the back end of the application, for example, in the program(s) stored in the control system.

The program(s) can include, all or in part, a series of executable steps for implementing the method of the present disclosure. A program, incorporating the present method, can be all or in part stored in the computer readable storage medium on the control system or, in all or in part, on a computer or device. It is envisioned that the control system can not only store the profile of users, but in one embodiment, can interact with a website for viewing on a display of a device such as a mobile device, or in another example the Internet, and receive user input related to the method and system of the present disclosure. It is understood that FIG. 1 depicts one or more profiles, however, the method can include multiple profiles, users, registrations, etc. It is envisioned that a plurality of users or a group of users can register and provide profiles using the control system for use according to the method and system of the present disclosure.

Still Further Embodiments and Examples

It is understood that the features shown in some of the FIGS., for example block diagrams, are functional representations of features of the present disclosure. Such features are shown in embodiments of the systems and methods of the present disclosure for illustrative purposes to clarify the functionality of features of the present disclosure.

The methods and systems of the present disclosure can include a series of operation blocks for implementing one or more embodiments according to the present disclosure. In some examples, operational blocks of one or more FIGS. may be similar to operational blocks shown in another figure. A method shown in one FIG. may be another example embodiment which can include aspects/operations shown in another FIG. and discussed previously.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further Additional Examples and Embodiments

Referring to FIG. 6, an embodiment of system or computer environment 1000, according to the present disclosure, includes a computer system 1010 shown in the form of a generic computing device. The method 100, for example, may be embodied in a program 1060, including program instructions, embodied on a computer readable storage device, or a computer readable storage medium, for example, generally referred to as computer memory 1030 and more specifically, computer readable storage medium 1050. Such memory and/or computer readable storage media includes non-volatile memory or non-volatile storage, also known and referred to non-transient computer readable storage media, or non-transitory computer readable storage media. For example, such non-volatile memory can also be disk storage devices, including one or more hard drives. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, the system or computer environment 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure. It is also understood that a control system 170, communicating with a computer system, can include all or part of the computer system 1010 and its components, and/or the control system can communicate with all or part of the computer system 1010 and its components as a remote computer system, to achieve the control system functions described in the present disclosure. The control system function, for example, can include storing, processing, and executing software instructions to perform the functions of the present disclosure. It is also understood that the one or more computers or computer systems shown in FIG. 1 similarly can include all or part of the computer system 1010 and its components, and/or the one or more computers can communicate with all or part of the computer system 1010 and its components as a remote computer system, to achieve the computer functions described in the present disclosure.

In an embodiment according to the present disclosure, one or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions. For example, in one embodiment according to the present disclosure, a program embodying a method is embodied in, or encoded in, a computer readable storage medium, which includes and is defined as, a non-transient or non-transitory computer readable storage medium. Thus, embodiments or examples according to the present disclosure, of a computer readable storage medium do not include a signal, and embodiments can include one or more non-transient or non-transitory computer readable storage mediums. Thereby, in one example, a program can be recorded on a computer readable storage medium and become structurally and functionally interrelated to the medium.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

Still Further Additional Examples and Embodiments

Figure 7:
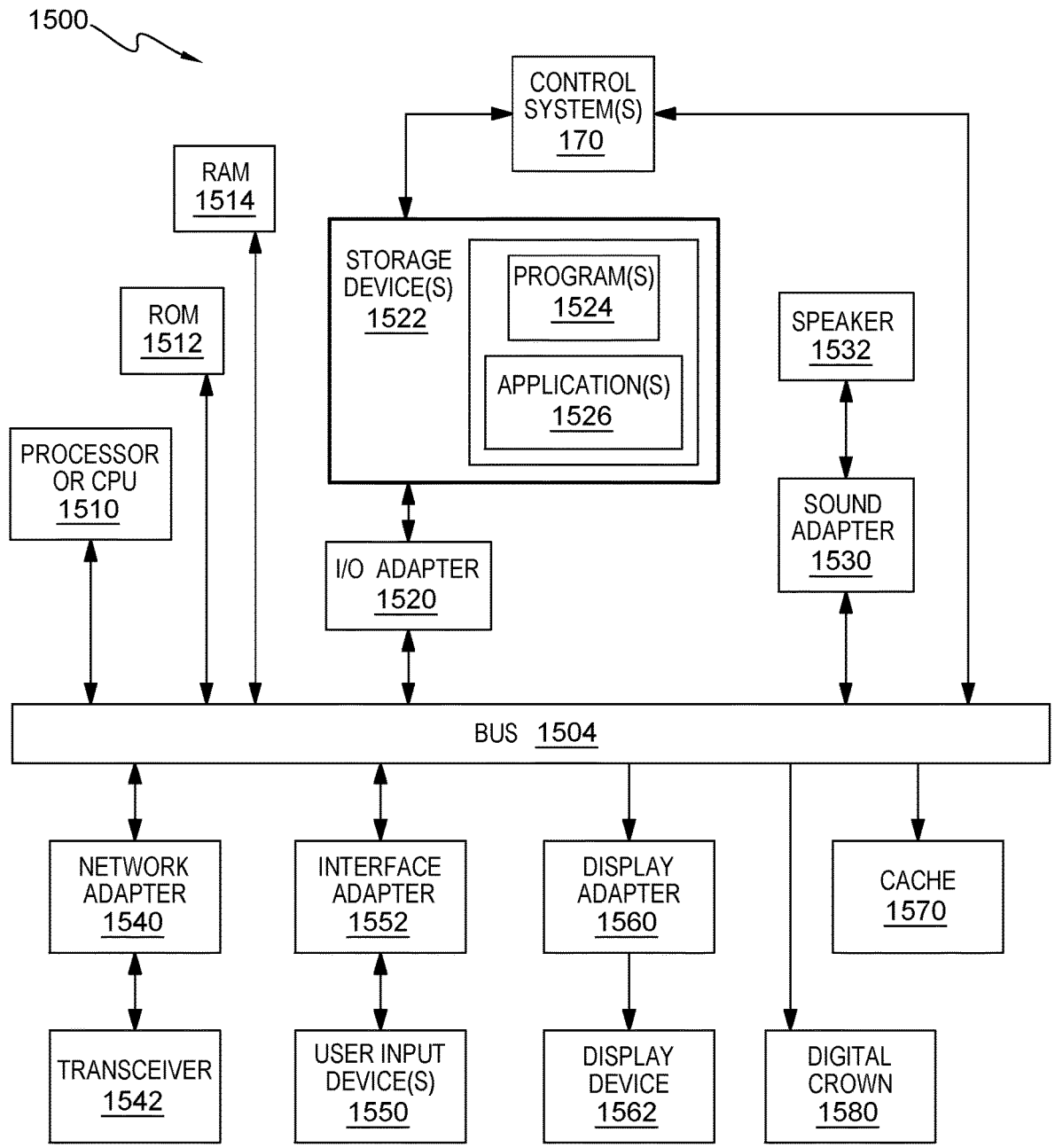
FIG. 7 is a schematic block diagram of a system depicting system components interconnected using a bus. The components for use, in all or in part, with the embodiments of the present disclosure, in accordance with one or more embodiments of the present disclosure.

Referring to FIG. 7, an example system 1500 for use with the embodiments of the present disclosure is depicted. The system 1500 includes a plurality of components and elements connected via a system bus 1504. At least one processor (CPU) 1510, is connected to other components via the system bus 1504. A cache 1570, a Read Only Memory (ROM) 1512, a Random Access Memory (RAM) 1514, an input/output (I/O) adapter 1520, a sound adapter 1530, a network adapter 1540, a user interface adapter 1552, a display adapter 1560 and a display device 1562, are also operatively coupled to the system bus 1504 of the system 1500. A digital crown 1580 can also be operatively coupled to the bus 1504.

One or more storage devices 1522 are operatively coupled to the system bus 1504 by the I/O adapter 1520. The storage device 1522, for example, can be any of a disk storage device (e.g., a magnetic or optical disk storage device), a solid state magnetic device, and so forth. The storage device 1522 can be the same type of storage device or different types of storage devices. The storage device can include, for example, but not limited to, a hard drive or flash memory and be used to store one or more programs 1524 or applications 1526. The programs and applications are shown as generic components and are executable using the processor 1510. The program 1524 and/or application 1526 can include all of, or part of, programs or applications discussed in the present disclosure, as well vice versa, that is, the program 1524 and the application 1526 can be part of other applications or program discussed in the present disclosure.

The system 1500 can include the control system 170 which communicates with the system bus, and thus can communicate with the other components of the system via the system bus. In one example, the storage device 1522, via the system bus, can communicate with the control system 170 which has various functions as described in the present disclosure.

In one aspect, a speaker 1532 is operatively coupled to system bus 1504 by the sound adapter 1530. A transceiver 1542 is operatively coupled to system bus 1504 by the network adapter 1540. A display 1562 is operatively coupled to the system bus 1504 by the display adapter 1560.

In another aspect, one or more user input devices 1550 are operatively coupled to the system bus 1504 by the user interface adapter 1552. The user input devices 1550 can be, for example, any of a keyboard, a mouse, a keypad, an image capture device, a motion sensing device, a microphone, a device incorporating the functionality of at least two of the preceding devices, and so forth. Other types of input devices can also be used, while maintaining the spirit of the present invention. The user input devices 1550 can be the same type of user input device or different types of user input devices. The user input devices 1550 are used to input and output information to and from the system 1500.

Other Aspects and Examples

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method for implementing an external digital crown for a smartwatch, comprising:
receiving, at a smartwatch having a display, an electronic cue from a digital crown, the electronic cue being related to a tactile event on the digital crown from a user, the digital crown being positioned contiguously with the watch;

analyzing the electronic cue to relate the tactile event to a movement of an indicator on the display for a selection on the display;

initiating the selection on the display based on the analysis of the electronic cue;

wherein the digital crown is positioned in a watch band, and the watch band is connected to the smartwatch;

detecting tactile pressure along a cylindrical roller as the digital crown, the cylindrical roller being touch sensitive, wherein moving a finger along the length of the cylindrical roller selects menu content displayed on the smartwatch;

receiving, at the smartwatch, motion and/or pressure on the digital crown; and synchronizing the motion and/or pressure on the digital crown with a selection on the display of the smartwatch.

2. The method of claim 1, wherein the watch band defines a width, and the cylindrical roller is positioned along the width of the watch band.

3. The method of claim 1, wherein the selection on the display includes the selection of an icon on the display.

4. The method of claim 1, further comprising:
sending the electronic cue from the digital crown, in response to a touch detection as part of the tactile event on the digital crown.

5. The method of claim 1, further comprising:
sending the electronic cue from the digital crown, in response to detecting tactile pressure on the digital crown as part of the tactile event.

6. The method of claim 1, wherein the digital crown is not part of a casing of the watch, wherein the casing houses the internal mechanisms of the watch and includes a watch band attachment portion for attaching a watch band to the casing.

7. The method of claim 1, wherein the digital crown is connected to a casing of the watch via the watchband and is not part of the casing of the watch, the casing housing the internal mechanisms of the watch and including a watchband attachment portion for attaching the watchband to the casing.

8. A system using a computer for implementing an external digital crown for a smartwatch, which comprises:

a computer system comprising; a computer processor, a computer-readable storage medium, and program instructions stored on the computer-readable storage medium being executable by the processor, to cause the computer system to perform the following functions to;

receive, at a smartwatch having a display, an electronic cue from a digital crown, the electronic cue being related to a tactile event on the digital crown from a user, the digital crown being positioned contiguously with the watch;

detect, at the smartwatch, tactile pressure along a cylindrical roller as the digital crown, the cylindrical roller being touch sensitive, wherein moving a finger along the length of the cylindrical roller selects menu content displayed on the smartwatch;

analyze the electronic cue to relate the tactile event to a movement of an indicator on the display for a selection on the display; and initiate the selection on the display based on the analysis of the electronic cue;

wherein the digital crown is positioned in a watch band, and the watch band is connected to the smartwatch; and the computer system performs the further functions to;

receive, at the smartwatch, motion and/or pressure on the digital crown; and synchronize the motion and/or pressure on the digital crown with a selection on the display of the smartwatch.

9. The system of claim 8, wherein the watch band defines a width, and the cylindrical roller is positioned along the width of the watch band.

10. The system of claim 8, wherein the selection on the display includes a selection of an icon on the display.

11. The system of claim 8, further comprising:
sending the electronic cue from the digital crown, in response to a touch detection as part of the tactile event on the digital crown.

12. The system of claim 8, further comprising:
sending the electronic cue from the digital crown, in response to detecting tactile pressure on the digital crown as part of the tactile event.

13. The system of claim 8, wherein the digital crown is not part of a casing of the watch, wherein the casing houses the internal mechanisms of the watch and includes a watch band attachment portion for attaching a watch band to the casing.

14. A smartwatch including an external digital crown, which comprises:

a smartwatch casing housing internal mechanisms for the operation of a smartwatch, and the smartwatch having a display;

a digital crown positioned in a watch band, the watch band being connected to the smartwatch casing, the digital crown having pressure sensitivity enabling tactile movement detection responsive to tactile movement of a user, and the digital crown being a cylindrical roller detectable of tactile pressure along the cylindrical roller, the cylindrical roller being touch sensitive, wherein moving a finger along the length of the cylindrical roller selects menu content displayed on the smartwatch; and the smartwatch having a receiving component for receiving an electronic cue from the digital crown in relation to the movement detection;

wherein the receiving component is configured to;
receive, at the smartwatch, motion and/or pressure on the digital crown; and
synchronize the motion and/or pressure on the digital crown with a selection on the display of the smartwatch.

* * * * *